Sept. 1, 1959  A. H. ILFREY ET AL  2,902,049
DEVICE FOR FLUID FLOW

Filed Nov. 10, 1955  3 Sheets-Sheet 1

INVENTORS.
Allen H. Ilfrey,
Daniel A. North,
BY
ATTORNEY.

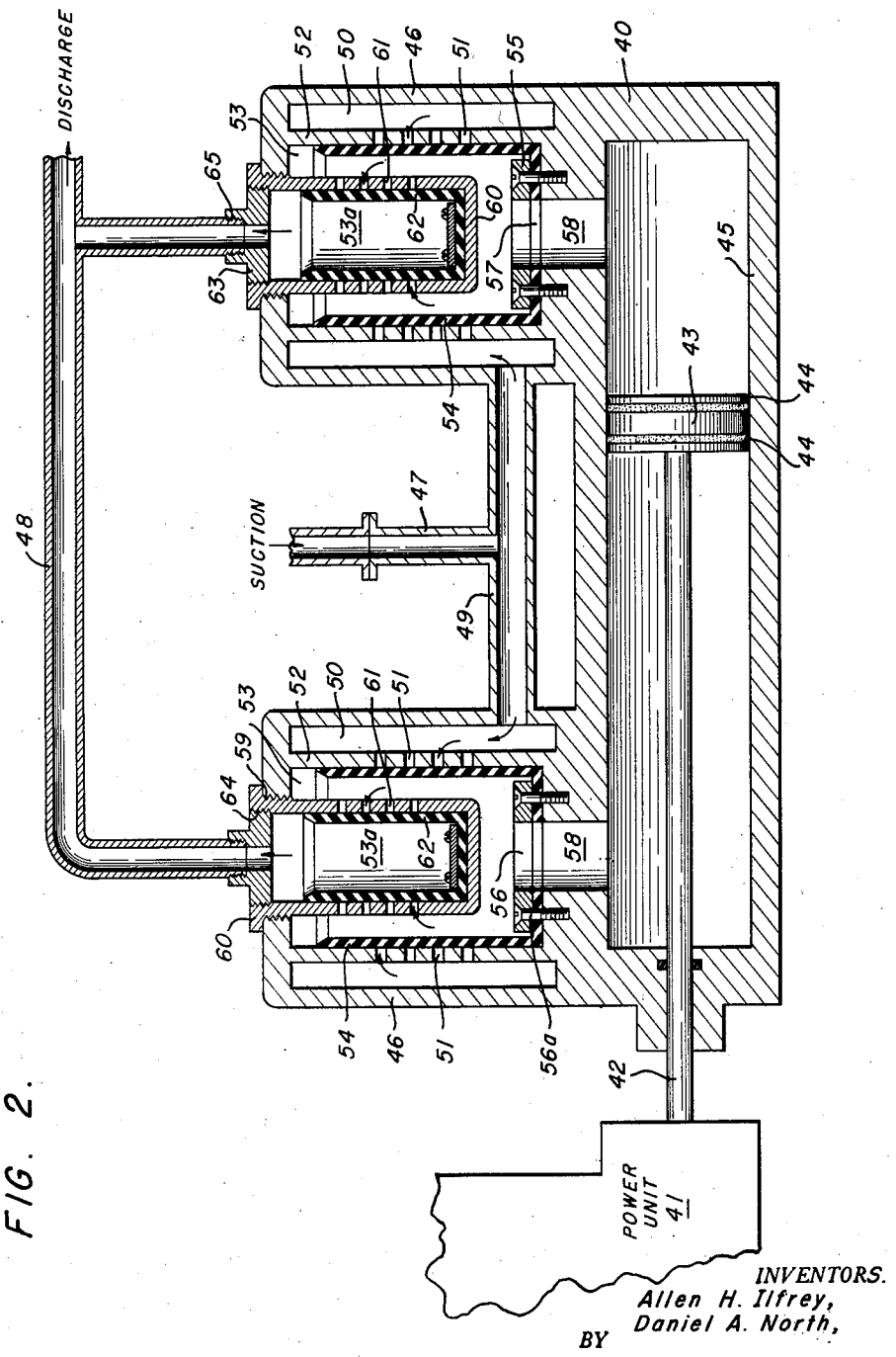

Sept. 1, 1959 A. H. ILFREY ET AL 2,902,049
DEVICE FOR FLUID FLOW
Filed Nov. 10, 1955 3 Sheets-Sheet 3

INVENTORS.
Allen H. Ilfrey,
Daniel A. North,
BY
ATTORNEY.

United States Patent Office 2,902,049
Patented Sept. 1, 1959

2,902,049

DEVICE FOR FLUID FLOW

Allen H. Ilfrey, Wink, and Daniel A. North, Houston, Tex., assignors, by mesne assignments, to Jersey Production Research Company, Tulsa, Okla., a corporation of Delaware Application November 10, 1955, Serial No. 546,069

3 Claims. (Cl. 137—512.1)

The present invention is directed to a device for flowing fluids. More particularly, the invention is directed to a device for pumping fluid, such as mud slurries, hydrocarbons, and the like. In its more particular aspects, the invention is concerned with a hydraulic valve for controlling fluid flow.

The present invention may be described as a device for moving fluids or for controlling the flow of fluids which comprises a first housing having a cylindrical bore provided with at least one radial passageway communicating the exterior with the interior of the first housing. Arranged within the cylindrical bore of the first housing is a first concentric deformable sleeve mounted therein and secured to the first housing at one end thereof. The first sleeve has a free end which flexes to open and close the radial passageway in the first housing. A second housing having a cylindrical bore is arranged concentrically in the first cylindrical bore and is also provided with at least one radial passageway communicating the exterior with the interior of the second housing. The second housing has a closed end and is connected to the first housing at an open end of the second housing. A second concentric deformable sleeve is mounted within the second cylindrical bore and is secured to the second housing at the closed end. The second sleeve has a free end which flexes to open and close the radial passageway in the second housing. Means are provided for communicating the radial passageway in the first housing with a source of fluid to be moved and means are provided for exerting a pressure differential within the cylindrical bore of the first housing whereby fluid is drawn into the first cylindrical bore through the radial passageway in the first housing and the fluid is then forced through the radial passageway into the second cylindrical bore.

The means for exerting a pressure differential within the cylindrical bore in the first housing is suitably a pumping means for reciprocating fluid into and out of the first cylindrical bore. This pumping means may suitably be a reciprocating pump and may be a piston arranged in a piston cylinder which may form part of a slush pump for pumping drilling fluid, and the like. The pumping means may also be a piston actuated by power fluid from an extraneous source. Similarly, the reciprocating means may include a plunger or bellows arrangement and suitable means for actuating same.

The present invention also encompasses a hydraulic valve embodying the first and second housings of the nature described supra wherein concentric deformable sleeves are arranged therein and wherein means are provided for exerting a pressure differential in the first cylindrical bore.

The deformable sleeves of the present invention are suitably constructed of a deformable material, such as natural or synthetic rubber, plastics and the like, having an elasticity and the characteristics of being deformed and then resuming its condition when undeformed. When the device is used in moving hydrocarbon or controlling the flow of hydrocarbons, a synthetic rubber or elastomer which resists the attack of hydrocarbons should be used. When non-hydrocarbon fluids, suspensions, slurries, and the like are used which do not attack natural rubber, the deformable sleeves may suitably be constructed of such material.

The present invention is suitable for use in submerged well pumps and is also suitable for use in oil field slush pumps and gas pressure machinery, check valves, and the like. The particular feature of the present invention is the elimination of the conventional ball and seat valve or plate disc and seat-type of valving which is subjected to considerable wear. In the present invention the improved valve and pumping device eliminates the usual inlet and outlet valves necessary for the successful operation of pumps and the like.

The invention will be further illustrated by reference to the drawing in which:

Fig. 2 is a partial sectional view of the hydraulic valve adapted for use in a pump, such as a mud or slush pump;

Figure 1:
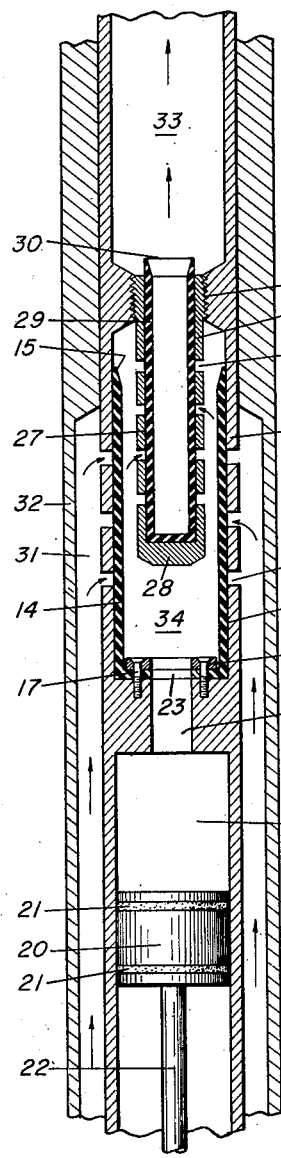
Fig. 1 illustrates the hydraulic valve of the present invention.

Referring now to Fig. 1 of the drawing, numeral 11 designates a first housing having a cylindrical bore 12 and which is provided with a plurality of radial passageways 13 communicating the exterior of the housing 11 with the cylindrical bore 12.

Arranged within the cylindrical bore 12 is a concentric deformable sleeve 14 having a free end 15 and being securely mounted within the bore 12 by an annular member 16 which clamps the deformable member 14 to the housing 11 by means of threaded screws 17.

The housing 11 has a passageway 18 which communicates the bore 12 with a piston cylinder 19 in the housing 11 and in which is arranged a piston 20 provided with suitable piston rings or sealing means 21. The piston 20 has a piston rod 22 which is connected to a suitable prime mover for reciprocating the piston 20 in the piston cylinder 19.

The annular member 16 and the deformable sleeve 14 have a cylindrical bore 23 which serves to communicate the passageway 18 with the interior of the deformable sleeve 14 in the bore 12.

Threadably connected to the housing 11 by means of mating threads 24 is a second housing 25 provided with a plurality of radial passageways 26 communicating the exterior of the housing 25 with the interior of the housing 25 which forms a cylindrical bore 27.

The lower end 28 of the housing 25 is closed and arranged within the cylindrical bore 27 is a concentric deformable sleeve 29 having a free end 30.

The first radial passageways 13 are in fluid communication with concentric conduit 31 which forms an inlet for the radial passageway 13 and the conduit 31 is defined by a third housing 32 which is arranged to surround the housing 11 and enclose same.

A conduit 33 communicates with the cylindrical bore 27 of the housing 25 and forms an outlet for the device of the present invention.

Referring now to Fig. 2, numeral 40 designates a pump housing actuated by a power unit 41 which may be a steam engine or internal combustion engine or electric motor and the like. The power unit 41 is connected by suitable means, not shown, to a piston rod 42 having a piston 43 provided with sealing members 44 arranged in the piston cylinder 45 in the housing 40. The housing 40 is provided with a plurality of valve housings 46 which form integral parts of housing 40 which have connected thereto a suction line 47 leading to mud or slush pits, not shown, and a discharge line 48 leading to drilling operations also not shown.

Communicating with the suction line 47 is a conduit 49 which, in turn, communicates with annular passageways 50 in the housing 46 which also communicate by radial passageways 51 in annular walls 52 with a chamber 53 in the housing 46. Connected to the housing 46 and arranged in the chambers 53 is a first concentric deformable sleeve 54 which normally covers the ports 41 and serves to close them. The first concentric deformable sleeve 54 is attached to the housing 40 by means of an annular plate 55 having a bore 56 therein. The plate 55 and the sleeve 54 are connected to the housing 40 by screws 56a. The sleeve 54 has a bore 57 which communicates with a passageway 58 in the housing 40 and serves to communicate the chamber 53 with the piston cylinder 45.

Connected to the housing 40 by mating threads 59 is an inner housing 60 provided with a plurality of radial ports 61 and having arranged therein a second concentric deformable sleeve 62 which normally serves to close the radial ports 61.

The housings 60 are closed on their upper ends by annular plates 63 which are threadably connected to the housing 61 by mating threads 64 to which the discharge conduit 48 is connected by mating threads 65.

Figure 3:
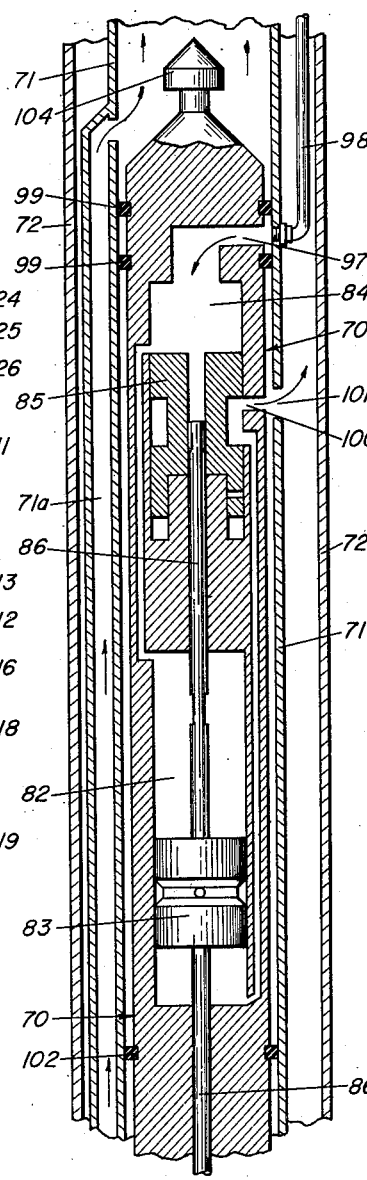
Figs. 3 and 3A are sectional views of a subsurface hydraulic pump assembly.
Figure 3A:
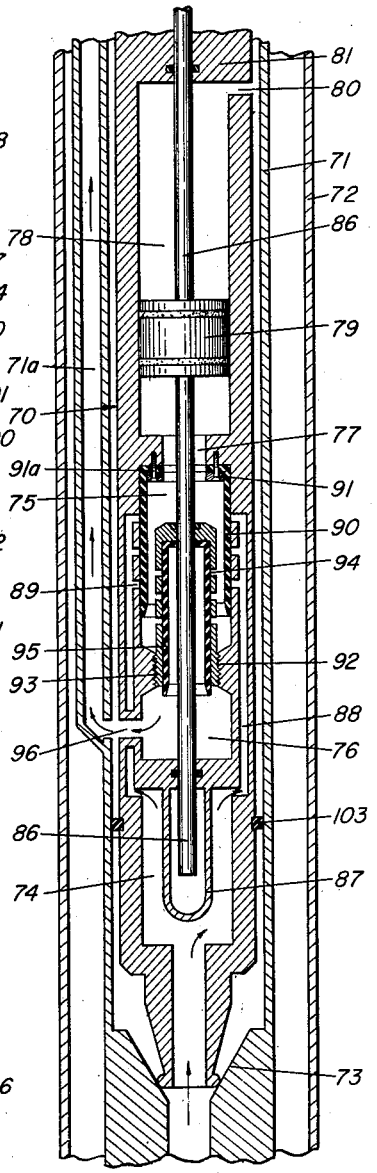

Referring now to Figs. 3 and 3A the invention is shown applied to a single acting subsurface hydraulic pump. In this embodiment of the invention a housing 70 is adapted to be arranged in the tubing 71 which is, in turn, arranged in the casing 72 which penetrates a productive interval or a plurality of productive intervals (not shown). The housing 70 is located in tubing 71 by means of a seating shoe 73 having a central opening therethrough. The lower end of housing 70 is provided with a suction passageway 74, a fluid intake chamber 75 and a fluid discharge chamber 76. Spaced above chamber 75 and fluidly communicating therewith by central opening 77 is a pump cylinder 78 having slidably arranged therein a piston 79. A port 80 communicates the upper end of cylinder 78 with the exterior of housing 70.

Vertically spaced above and separated by wall member 81 is an engine valve cylinder 82 having arranged therein for vertical movement a piston 83. The upper end of housing 70 is provided with an engine valve chamber 84 in which is located an engine valve 85. Engine valve 85 works on the principle of unbalanced areas and is well known to the art so will not be described in detail. A valve such as 85 is described in Composite Catalog of Oil Field and Pipeline Equipment, 11th ed., page 2840.

Pistons 79, 83, and slide valve 85 are all fixed to a common hollow piston rod 86 which has its lower end projecting into intake passageway 74 and is enclosed in a balance tube 87.

Vertical passageway 88 fluidly communicates intake passageway 74 with intake chamber 75 by means of radial ports 89.

Chamber 75 has concentrically arranged therein a deformable valve or sleeve member 90 which is attached to the housing 70 by an annular plate 91 and screws 91a. The radial ports 89 are normally closed by the deformable sleeve 90.

Threadedly connected to the housing 70 by mating threads 92 is an intervalve housing 93 which is provided with a plurality of radial ports 94, the housing 93 being arranged concentrically within the chamber 75.

Valve housing 93 also has arranged therein a deformable sleeve member 95 which normally closes the radial ports 94.

The upper end of housing 93 and sleeve 95 define an opening for passage of piston rod 86.

A port 96 fluidly communicates the discharge chamber 76 with the exterior of housing 70. Tubing 71 is provided with a vertical passageway 71a which communicates port 96 with the interior of the tubing 71 above the housing 70.

The upper end of engine valve chamber 84 communicates with power fluid inlet port 97. A power fluid conduit 98 is connected to the tubing 71 and communicates with the interior thereof adjacent the inlet port 97 of housing 70.

Arranged on housing 70 above and below port 97 sealingly engaging housing 70 with the interior or tubing 71 are annular sealing rings 99. Housing 70 is provided with a power fluid discharge port 100 adjacent chamber 84. The tubing 71 is also provided with a power fluid discharge port 101.

Sealing rings 102 and 103 are arranged on housing 70 and serve to isolate the well fluid being pumped and the power fluid. The upper end of housing 70 is provided with a wire line retrieving line 104.

Figure 4:
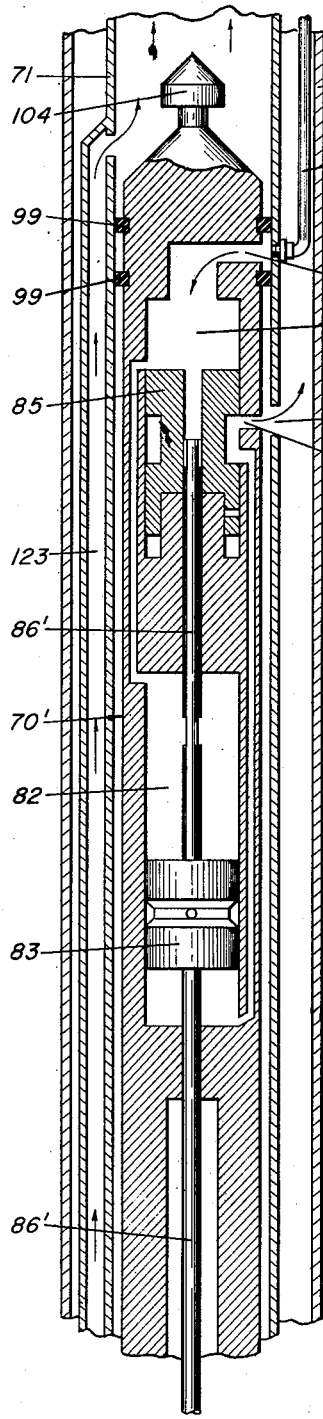
Figs. 4 and 4A are sectional views of a double-acting subsurface hydraulic pump assembly.
Figure 4A:
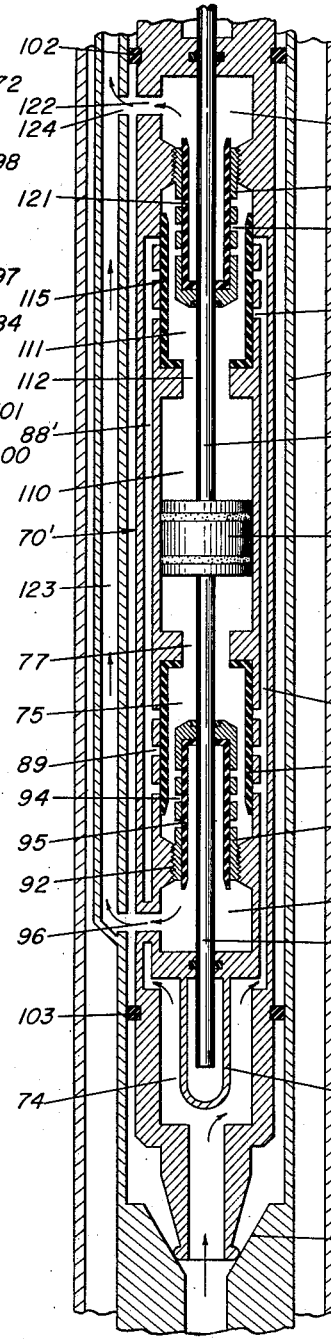
Figure 4B:
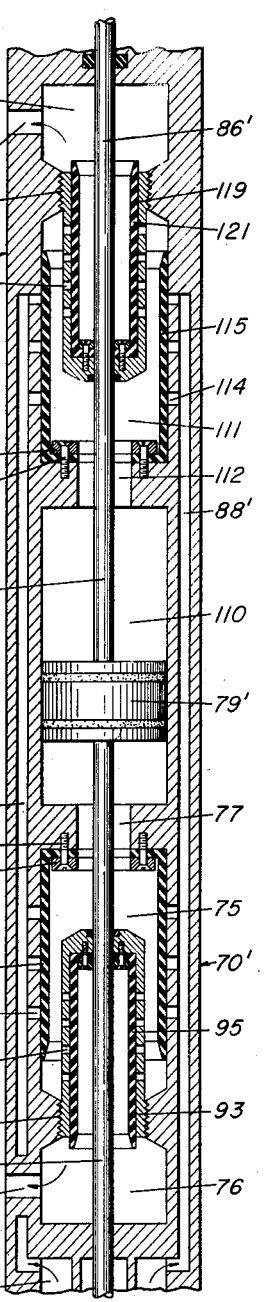
Fig. 4B is an enlarged sectional view of the device of Fig. 4A.

In Figs. 4 and 4A a further embodiment is shown in which a double acting subsurface hydraulic pump is described. The device of Figs. 4 and 4A is similar to that of Figs. 3 and 3A and like parts will be defined by like numerals. A housing 70' is provided with a pump cylinder 110. The portion of the assembly below cylinder 110 is the same as described in Figs. 3 and 3A.

The device of Figs. 4 and 4A differs from Figs. 3 and 3A in that a fluid intake chamber 111 is vertically spaced above and communicates by passage 112 with cylinder 110. Cylinder 110 also has arranged therein a pump piston 79' fixed on piston rod 86'. Housing 70' is also provided with a discharge chamber 113. Vertical passageway 88' fluidly communicates intake passage 74 with intake chambers 75 and 111 by means of radial ports 89 and 114. Chamber 111 has concentrically arranged therein a deformable valve or sleeve member 115 which is attached to the housing 70' by an annular plate 116 and screws 117. The radial ports 114 are normally closed by the deformable sleeve 115. Threadedly connected to the housing 70' by mating threads 118 is an inner valve housing 119 which is provided with a plurality of radial ports 120, the housing 119 being arranged concentrically within the chamber 111. Valve housing 119 also has arranged therein a deformable sleeve member 121 which normally closes the radial ports 120. The lower end of housing 119 and sleeve 121 define an opening for passage of piston rod 86'.

Discharge chamber 113 communicates with the exterior of housing 70' by port 122. The tubing 71 is provided with a fluid passage 123 which is similar to the passage 71a of Figs. 3 and 3A. Passage 123 has an additional port 124 which is adjacent port 122. The passage 123 fluidly communicates the ports 96 and 122 with the interior of the tubing 71 above the housing 70'.

Slidably arranged in cylinder 110 is a pump piston 79' which is fixed to piston rod 86'. Piston rod 86' as in Figs. 3 and 3A has connected thereto an engine valve 85 and a power piston 83. As will be seen from the several figures of the drawing, the free end of the sleeves face the direction of flow through the valve and the sleeves are connected to the housings at the closed end of the housings and thus prevent any trap from being formed for abrasive fluids flowing through the ports of the housings.

The present invention may be suitably employed as a slush or mud pump to be used in well drilling operations and in such use the operation may be as follows with respect to Fig. 1.

On reciprocation of the piston 20 on the suction stroke, the deformable sleeve 14 will be flexed inwardly, the free end moving away from the cylindrical bore 12 and allowing fluid to be drawn from the conduit 31 through the radial passageways 13 into the chamber 34 enclosed by the deformable sleeve 14. The suction stroke of the piston 20 holds the deformable sleeve 29 against the cylindrical bore 27 closing the radial passageways 26.

On the pressure stroke, the deformable sleeve 14 is forced against the cylindrical bore 12 closing the radial passageways 13 by forcing or flexing the deformable sleeve 29 inwardly uncovering the radial passageways 26 and causing the fluid in the chamber 24 to move through the radial passageways 26 into the discharge conduit 33 on the flexing of the free end 30 of the sleeve 29. On the suction stroke, the radial passageways 26 are closed and the radial passageways 13 are opened allowing the cycle of operations to be repeated.

The device of the present invention may be used in subsurface pumping to replace the standing valve and the travelling valve. In these particular instances, fluid will be reciprocated into and out of the valve 34 causing a pressure differential to be exerted thereon and allowing the alternate flexing of the deformable sleeves 14 and 29.

For example, the outer housing 32 of the present invention may suitably be a cylindrical bore which may form part of the producing string in a well drilled in the earth's surface.

Referring now to Fig. 2, the operation of the device of the present invention when used with respect to a mud or slush pump will be described. The power unit 41 will reciprocate the piston 43 in the piston cylinder 45. On the power stroke, mud from the slush pits, not shown, will be drawn from the inlet line 47 into the passageway 49 into the chamber 53 on the left through the radial ports 51, the cylindrical deformable sleeve 54 flexing inwardly to uncover the radial ports 51. On the power stroke the mud fluid contained in the chamber 53 on the right would be discharged through the radial ports 61 in housing 60 by inward flexing of the deformable sleeve 62, causing the mud fluid to pass from chamber 53 to the inner chamber 53a of the housing 60 and then forced into the discharge line 48. On the suction stroke with the piston 43 moving to the left, the mud drawn into chamber 53 in the left-hand housing 46 would be forced through the radial ports 61 in the left-hand housing 60 by inward flexing of the sleeve 62 in the left-hand housing 60. From the left-hand inner chamber 53a the mud would be forced into discharge line 48. While these operations are being performed, the right-hand housing 46 and chamber 53 will have mud drawn into them and the cycle repeated.

With respect to the embodiment of Figs. 3 and 3A, power fluid is introduced into the engine valve chamber 84 by way of conduit 98 which leads to a source of fluid pressure (not shown) at the earth's surface. Fluid pressure entering chamber 84 causes reciprocation of engine valve 85 and similar reciprocation of power piston 83 and therefore pump piston 79.

Upward movement of piston 79 causes deformable sleeve 90 to flex inwardly and allows well fluid to be drawn through radial ports 89 and into intake chamber 75. Any fluid accumulated in chamber 78 above piston 79 is forced out through port 80. Downward movement of piston 79 flexes sleeve 90 back to its normal position, closing ports 89 and also causes sleeve 95 to flex inwardly thereby allowing the fluid in chamber 75 to be forced out through radial ports 94 into discharge chamber 76 and thence into passageway 71a.

In the operation of the device of Figs. 4 and 4A the pump piston 79 is reciprocated by the same means as in Figs. 3 and 3A. Upward movement of pump piston 79' causes well fluid to be drawn into intake chamber 75. This movement also causes fluid which is assumed to be in intake chamber 111 to be forced out through radial ports 120 into discharge chamber 113 and from there into passageway 123.

Downward movement of piston 79' causes fluid to be drawn into chamber 111 and at the same time forces fluid out of chamber 75 into discharge chamber 76 and thence to passageway 123.

From the foregoing description taken with the several figures of the drawing, it will be seen that we have provided means for moving fluid and also an improved valve means having parts not affected by abrasion and/or erosion. The device of the present invention is, therefore, of considerable use and has many advantages over conventional equipment.

The nature and objects of the present invention having been completely described and illustrated, what we wish to claim as new and useful and to secure by Letters Patent is:

1. A hydraulic valve which comprises a first housing having a first cylindrical bore and provided with at least one radial passageway communicating the exterior with the interior of the first housing, a first concentric deformable elastic sleeve mounted within said first cylindrical bore and secured to the first housing at one end, said first sleeve having a continuous wall covering the radial passageway in the first housing and a free end and flexing to open and close the radial passageway in the first housing, said first sleeve being open on both ends, a second housing having a second cylindrical bore arranged concentrically within and spaced laterally from said first housing and provided with at least one radial passageway communicating the exterior with the interior of the second housing, said second housing having a closed end and being connected to said first housing at an open end, and a second concentric deformable elastic sleeve mounted within said second cylindrical bore and secured at a closed end to the closed end of the second housing, said second sleeve having a continuous wall covering the radial passageway in the second housing and a free end and flexing to open and close the radial passageway in the second housing, the free ends of said first and second sleeves facing the direction of flow through said valve.

2. A hydraulic valve in accordance with claim 1 in which the first and second deformable sleeves are natural rubber.

3. A hydraulic valve in accordance with claim 1 in which the first and second deformable sleeves are synthetic rubber.

References Cited in the file of this patent

UNITED STATES PATENTS

| 1,986,831 | Le Valley | Jan. 8, 1935 |
| 2,124,788 | Leman | July 26, 1938 |
| 2,606,032 | Warren | Aug. 5, 1952 |
| 2,662,485 | Ilfrey | Dec. 15, 1953 |

FOREIGN PATENTS

| 2,525 | Great Britain | of 1892 |
| 382,198 | Great Britain | Oct. 20, 1932 |
| 767,082 | Germany | Oct. 25, 1951 |
| 1,017,649 | France | Sept. 24, 1952 |